United States Patent Office 3,242,146
Patented Mar. 22, 1966

3,242,146
PROCESS FOR THE PRODUCTION OF
CONDENSATION PRODUCTS
Martin Meister, Leverkusen, Germany, assignor to Farbenfabriken Bayer Aktiengesellschaft, Leverkusen, Germany, a corporation of Germany
No Drawing. Filed Dec. 14, 1961, Ser. No. 159,430
Claims priority, application Germany, Dec. 19, 1960,
F 32,791
6 Claims. (Cl. 260—79.3)

The present invention relates to a process for the production of condensation products. More particularly it concerns a process wherein styrene or its derivatives are reacted with esters of sulphonic acid or chlorosulphonic acid; furthermore it concerns a process wherein the polystyrene sulphonic acid esters formed by the reaction of styrene or its derivatives with esters of sulphonic acid or chlorosulphonic acid are saponified or transesterified to yield especially water-soluble higher molecular polystyrene sulphonic acids.

It has been found that the esters of sulphuric acid or the esters of chlorosulphonic acid react with monomeric styrene with a strongly exothermic reaction. It is advisable to mix the reaction components only gradually, most advantageously by slowly adding dropwise styrene to the aforesaid esters, for example, dimethyl sulphate or chlorosulphonic acid methyl ester. Furthermore, the reaction is advantageously rendered less violent by cooling and/or the addition of suitable diluents. Not more than one mol of the esters should be reacted with one mol of styrene.

If the mixing takes place while maintaining low temperatures by cooling, for example, below 35° C., more viscous high molecular products are obtained than when effecting the mixing at high temperatures without cooling.

More viscous products are also obtained by mixing the reaction components at low temperatures in the presence of solvents. In general, however, these products are not as viscous as the corresponding condensation products obtained in the absence of solvents.

After mixing the reaction components, the mixture is heated to the boil under reflux provided a diluent is used, but, in general, the operation should not be carried out above 175° C. Low temperatures are also preferred in order to obtain the least coloured products. Reactions of styrene with sulphuric acid esters generally require higher temperatures than those with chlorosulphonic acid esters.

The course of the condensation reaction by polymerisation or telomerisation is determined by the increased viscosity of the solutions or melts, or when, for example, chlorosulphonic acid esters are used, by the decreased evolution of hydrogen chloride. The presence of peroxides accelerates the condensation reaction, but they are not absolutely necessary since even stabilised styrene polymerises sufficiently rapidly. Additions of catalytically active metals or metal salts may also be dispensed with.

When a sample of the reaction mixture solidifies to a readily pulverizable mass, or can be saponified with small quantities of water to give a clear solution stable to boiling or itself is directly soluble and stable to boiling, the condensation is completed by heating.

The condensation products are readily soluble in conventional organic solvents, especially in chloroform, benzene, styrene and natural oils. Some condensation products which are obtained with dimethyl sulphate are also directly soluble in water.

It has also been found that the condensation products described above can be saponified by slowly adding water, preferably in the hot, to form water-soluble sulphonic acids. The water is immediately absorbed, sometimes with strong swelling phenomena, and a clear, thickly liquid solution is gradually and slowly formed which may be further diluted by slowly adding more water. The dilute solutions are stable to boiling. Upon the addition of alkali metal or ammonium hydroxide, the corresponding salts are formed which are also readily soluble. By evaporation, advantageously in a vacuum, or volatilizing at room temperature, the free acids as well as their salts may be obtained in dry form. Saponification of the aforesaid ester-like condensation products may also be carried out with alkali metal or ammonium hydroxide solutions the salts thus being directly obtained. It is more advantageous, however, to isolate the condensation products in solid form by salting out the acid solutions or the solutions neutralised with alkalis with sodium chloride or ammonium chloride.

To promote saponification of the polystyrene sulphonic acid esters, it is sometimes expedient to homogenise the hot melt with a little dioxan or glacial acetic acid and to add slowly water in small portions, as described above. It is also possible to boil for some time the melt dissolved in glacial acetic acid, especially if condensation products are used obtained with chlorosulphonic acid ester, the free, water-soluble sulphonic acids likewise being formed by transesterification and formation of ethyl acetate. The sulphonic acids are advantageously concentrated by evaporation in order to remove the organic solvents.

The conversion of styrene with chlorosulphonic acid esters into directly water-soluble condensation products proceeds surprisingly smoothly even at the start of the condensation reaction when glacial acetic acid or the next higher fatty acids are simultaneously used. Glacial acetic acid is added either immediately after mixing the reaction components or after completion of the exothermic reaction, but it is still more advantageous to introduce dropwise styrene diluted with glacial acetic acid into the chlorosulphonic acid ester. Thus, the condensation can be easily controlled, the splitting off of the gaseous hydrogen chloride proceeds more rapidly and the further reaction is being accelerated. Boiling under reflux is continued until samples diluted with water are clear and stable to boiling. After the addition of a little water, the solution is advantageously evaporated down in a vacuum or concentrated whereby the acetic acid ester formed in the reaction is removed. These condensation products can also be obtained by salting out the acid or neutralised aqueous solutions with sodium chloride or ammonium chloride.

Condensation of α-methyl styrene or nuclearly substituted styrenes with esters of sulphuric acid or those of chlorosulphonic acid is carried out in a similar manner, but generally proceeds less smoothly than that with styrene itself.

The sulphonic acids and their alkali metal or ammonium salts produced according to the present invention by saponification from the water-insoluble polystyrene sulphonic acid esters are readily water-soluble provided not more than about five mols of styrene per one mol of dimethyl sulphate or chlorosulphonic acid ester are used for the condensation. If more styrene is used, the condensation products become progressively more electrolyte-sensitive and less water-soluble. The condensation products are also readily soluble in all water-miscible organic solvents, and some even in chloroform, benzene, styrene, acrylonitrile as well as in some vegetable and animal oils. With salts of bi- and polyvalent metals, insoluble precipitates are generally formed from solutions of the condensation products according to the invention.

The condensation products produced according to the invention can be used as fixing agents for cationic tanning agents and basic dyestuffs, dispersing agents, intermediates for high molecular substances, solubilisers, raw material for washing agents and detergents, for after-tanning of leather produced with mineral tanning agents, the good light fastness of the products of the invention being especially useful.

The following examples serve to illustrate the invention without, however, limiting the scope thereof.

*Example 1*

(a) To 252 g. (2 mols) of dimethyl sulphate previously heated to 45° C. there are added dropwise with vigorous stirring 208 g. (2 mols) of styrene so that after the addition, due to the reaction heat, the reaction rises to about 110° C. the time required therefor amounts to 15–20 minutes. The reaction can be well controlled by the rate of both dropwise addition and stirring. The temperature is further raised to 155° C. within ½ hour and then kept constant. The reaction mixture becomes slowly viscous. It is heated for a further 5–6 hours whereby the melt becomes immediately water-soluble and may be isolated. To convert the condensation product into a concentrated aqueous solution, 50 cc. of water are introduced dropwise with good stirring within 15 minutes at 140° C. at first with external heat supply, and the mixture is further homogenised by a more rapid addition of a further 250 cc. of water. Yield 660 g. of a dark solution having a concentration of 54%, an acid number of 151 and a pH value of 0.5.

(b) To 126 g. of dimethyl sulphate (1 mol) there are rapidly added dropwise at 40–45° C. with stirring 208 g. (2 mols) of styrene (if the dropwise addition is started at room temperature, a somewhat harder limpy mass is at first formed which impedes stirring, but redissolves later). Because of the exothermic reaction the temperature rapidly rises, the reaction product becomes milky at 50° C. and changes to a thin precipitate which redissolves at 80° C. Styrene can be added dropwise within less than ½ hour, the temperature rising to 110° C. The temperature is raised to 155° C. within 1 hour and kept constant between 155–160° C. for 6 hours. Samples then solidify to form a hard mass which is pulverisable. A total of 300 cc. of water is slowly added dropwise to the melt at 140° C. with good stirring. 580 g. of a thickly liquid, brown solution are obtained which can be mixed with water in any desired proportion and having a concentration of 48–49%, an acid number of 80 and a pH value of 0.8.

(c) In an analogous manner 312 g. of styrene (3 mols) are rapidly added dropwise from 40° C. upwards with good stirring. The temperature rises to 96° C. within 35 minutes during the dropwise addition. The temperature is raised to 155° C. within 1½ hours and kept between 155 and 160° C. for 6½ hours. After cooling, a sample of the melt is hard and pulverisable.

To control the progress of the polymerization reaction it is advantageous to take samples from time to time. If they solidify to a hard pulverisable mass they generally melt homogeneously even with very little water upon heating in a boiling water bath; if, upon addition of more water, a clear solution stable to boiling is formed, the reaction is completed.

For the conversion into the water-soluble sulphonic acid 50 cc. of water are added dropwise within 15 minutes from 150° C. upwards with further external heating; the water is absorbed and the temperature falls. A total of 500 cc. of water is thus added with continuous stirring.

920 g. of a brown solution are obtained having a concentration of 43%, an acid number of 55 and a pH value of 1.0. It can be mixed with water in any desired proportion. The product can also readily be isolated in the solid form by salting out with common salt.

*Example 2*

208 g. (2 mols) of styrene are added dropwise at room temperature with stirring to 130 g. of chlorosulphonic acid methyl ester (1 mol) so that the final temperature does not exceed 115° C. Hydrogen chloride escapes. The temperature is kept fairly constant at 115° C. After about 2 hours the melt is a viscous froth, and after 5–6 hours a sample of the melt is pulverisable. 50 cc. of hot water are then added dropwise to the melt within 15 minutes and with good stirring and further heated until after about 45 minutes a clear thickly liquid melt is formed and a sample dissolves clear in water. An equal quantity of water is then slowly added to the solution while gently boiling. The solution is further diluted until the desired concentration is attained, or poured out for drying up. The powder is water-soluble and a dilute solution is stable to boiling.

α-Methyl styrene is reacted in a similar way, but it is advantageously heated at 175° C. for twice the time.

*Example 3*

(a) According to the instructions given in Example 2, 208 g. (2 mols) of styrene are rapidly added dropwise with vigorous stirring but without cooling to 261 g. (2 mols) of chlorosulphonic acid methyl ester. The temperature rises from 20° C. to nearly 100° C. and is maintained for 15 minutes in a boiling water bath. After temporarily removing the water bath, 120 cc. of glacial acetic acid are added dropwise with vigorous stirring. A violent hydrogen chloride evolution sets in immediately and the ethyl ester formed boils. If necessary, the reaction is rendered less violent by briefly cooling the mixture with water. It is then boiled under reflux in a boiling water bath. After 1 hour the hydrogen chloride evolution is very light and the melt becomes slowly homogeneously viscous. After heating for 2 hours, the ethyl acetate is distilled off, the distillation finally being carried out at reduced pressure to remove the residual hydrogen chloride and ethyl acetate. The product is heated on a boiling water bath for a total of 3–4 hours, 25 cc. of water are then carefully and slowly added to the melt, more water slowly added still on the boiling water bath (the temperature of the melt rises at first to 104° C.), until the total reaches 400 cc.

About 800 g. of a pale brown, somewhat viscous solution are obtained having a concentration of 51%, an acid number of 196 and a pH value of 0.4.

(b) As indicated under (a), 208 g. (2 mols) of styrene are rapidly added dropwise within 15 minutes with vigorous stirring to 131 g. (1 mol) of chlorosulphonic acid methyl ester. The temperature rises from 18° C. to 90° C. The mixture is further stirred until the temperature begins to fall, and then heated on the boiling water bath for a further ½ hour. 60 cc. of glacial acetic acid are then added with vigorous stirring whereupon a strong hydrogen chloride evolution sets in and the mixture begins to boil. Heating is continued on the boiling water bath for a further 4 hours. During the last ½ hour the residual hydrogen chloride and ethyl acetate are filtered off with suction. A total of 400 cc. of water is then added dropwise to the mixture on the boiling water bath. The residual ethyl acetate is thereby removed with some steam. 650–700 g. of a pale brown, little viscous solution are obtained having a concentration of 46%, an acid number of 120 and a pH value of 0.6.

(c) In the same manner 312 g. (3 mols) of styrene are rapidly added dropwise and with vigorous stirring to 131 g. (1 mol) of chlorosulphonic acid methyl ester. The temperature rise can easily be controlled by the rate of both stirring and dropwise addition. The last third of styrene is rapidly added. The time for the dropwise addition amounts to about 20 minutes, the temperature rising from 17 to 77° C. The temperature is then slowly raised to 115° C. within 1 hour and kept constant for 1 hour. Hydrogen chloride is liberated and the mixture becomes more viscous. 60 cc. of glacial acetic acid are then introduced dropwise, whereby a violent hydrogen chloride evolution immediately sets in, the reaction subsiding after ½ hour. The mixture is kept at 115° C. for a further 2½ hours, finally at reduced pressure. Altogether 500 cc. of water are then added under the aforesaid conditions. The resultant solution is pale brown and can be mixed with water in any desired amount. The product can be salted out by adding sodium chloride to the hot solution and, after pressing out, obtained in solid form.

*Example 4*

(a) 208 g. (2 mols) of styrene are introduced dropwise with good stirring and water cooling into 261 g. (2 mols) of chlorosulphonic acid methyl ester in such a manner that the internal temperature remains as far as possible between 30 and 35° C. The reaction can easily be kept within this temperature range by the rate of both stirring and dropwise addition. The time of the dropwise addition amounts about 20–25 minutes. Stirring is then continued without cooling. When the reaction is no longer exothermic and the temperature of the now viscous mixture falls, slow heating is continued to about 105° C. in the course of 1 hour. During this operation hydrogen chloride is slowly split off. 120 cc. of glacial acetic acid are then rapidly added dropwise with vigorous stirring, whilst hydrogen chloride violently evolves. Due to the formation of ethyl acetate frothing takes place which can be checked by vigorous stirring. Boiling under reflux is continued on the boiling water bath. The odour of chlorosulphonic acid ester completely disappears after 2 hours. The ethyl acetate is distilled off in a boiling water bath and the temperature of the reaction mass then rises to about 100° C.

To the now very viscous melt 50 cc. of water are at first slowly added dropwise. 500 cc. of hot water are then added more rapidly on a boiling water bath, the bulk of the ethyl acetate distilling off. After cooling, the product (920 g.) is viscous and soluble in water in any desired proportion. It has a concentration of about 45%, an acid number of 165 and a pH value of 0.4. If necessary, the solution may be neutralised with a concentrated ammonium hydroxide solution or with a sodium hydroxide solution. These products are also soluble in water in any desired proportion.

(b) To 131 g. of chlorosulphonic acid ester there are added rapidly with good stirring and water cooling 208 g. of styrene, so that the temperature of the reaction mixture does not exceed 35° C., if possible; the time required amounts to about 25–30 minutes. Stirring is continued without cooling until the temperature has risen to 45° C. due to the further exothermic reaction. The mixture is then briefly cooled and the reaction completed between 45–50° C. The reaction product is now fairly viscous. It is heated to 100° C. in the course of 1 hour and 60 cc. of glacial acetic acid are then rapidly added dripwise with vigorous stirring. A strong evolution of hydrogen chloride and reflux-boiling sets in due to the formation of ethyl acetate. Heating at the boil on a boiling water bath is then continued for a total of about 3 hours. The frothy melt thus becomes slowly clear. After the addition of 25 cc. of water, the ethyl acetate is distilled off and 500 cc. of hot water are slowly added on a boiling water bath so that the ethyl acetate is distilled off. About 800–850 g. of a pale brown product are obtained which can be mixed with water in any desired proportion. The product may be neutralized with a sodium hydroxide or ammonium hydroxide solution or, alternatively, salted out with sodium chloride or ammonium chloride.

(c) In a similar manner, 312 g. of styrene are added dropwise to 131 g. of chlorosulphonic acid methyl ester. The time required amounts to about 30–35 minutes while cooling with water, and the temperature is 30–35° C. Without cooling with water, a gentle exothermic reaction sets in which is completed below 55° C. The mixture is heated to 110° C. in the course of 1 hour, and 60 cc. of glacial acetic acid are added with vigorous stirring.

When the violent hydrogen chloride evolution has subsided, the mixture is heated for a further 4 hours on a boiling water bath, and a total of 600 cc. of hot water is then added as indicated under (a) and (b). The ethyl acetate is distilled off. Yield 1050 to 1100 g. of a light coloured, viscous product having a concentration of 39%, an acid number of 83 and a pH value of 0.7. It is soluble in water in any desired proportion.

*Example 5*

(a) To a mixture of 208 g. of styrene and 60 cc. of glacial acetic acid, 130 g. of chlorosulphonic acid methyl ester are added dropwise with rapid stirring beginning at 20° C. As soon as a temperature of 30° C. is reached, the mixture is cooled with water until the temperature has fallen to 25° C. By an evenly dropwise addition while cooling alternatively with water and air, the reaction temperature is kept between 30 and 35° C. The time required for the dropwise addition amounts to about 45 minutes. The temperature is allowed to rise slowly by the exothermic reaction sometimes not yet ended whilst alternatively cooling the mixture with water and air, until the reaction is finally completed at a temperature below 45° C. The reaction mixture is now markedly more viscous. It is slowly heated to a higher temperature, cloudiness occurring in some cases which disappears at higher temperatures. From about 80–85° C. hydrogen chloride is liberated and due to the further gentle exothermic reaction and the formation of ethyl acetate boiling takes place. As soon as the violent splitting off of hydrogen chloride subsides, the temperature of the reaction mixture is raised to 115° C. and the same temperature is maintained for 2 hours. In general, samples are already water-soluble and stable to boiling after ½ hour. The ethyl acetate formed is distilled off, 25 cc. of water are first added dropwise and then more rapidly 400–450 cc. of water at 100° C. The residual ethyl acetate is distilled off with steam. After cooling, a pale brown, very viscous solution is obtained which can be mixed with water in any proportion.

(b) In a similar manner 131 g. of chlorosulphonic acid methyl ester are slowly added dropwise with good stirring to a mixture of 312 g. of styrene and 60 cc. of glacial acetic acid, the reaction temperature being kept between 30 and 35° C. by alternatively cooling with water and air. The time required for the dropwise addition amounts to about 25–30 minutes. The temperature is then allowed to rise slowly further by the exothermic reaction not yet finished, and the reaction is completed below 50° C., if necessary by briefly cooling. The reaction product has become rather viscous. It is slowly heated to a higher temperature, a gentle exothermic reaction again takes place at 85° C., hydrogen chloride is formed and the reaction product begins to boil due to the simultaneous formation of ethyl acetate. The temperature is slowly raised to 115° C. and maintained for 3 hours. At this temperature 50 cc. of water are then carefully added dropwise within 15 minutes. When the reaction products gently boil, a further 900 cc. of hot water are rapidly added and, at the same time, the ethyl acetate is distilled off. The product is of a light colour and dissolves in water in any proportion. It may be salted out by the addition of sodium chloride at 95° C. and obtained in a solid form by strongly pressing it out while hot. It is readily water-soluble.

*Example 6*

(a) A solution of 208 g. of styrene in 60 cc. of glacial acetic acid is slowly run at room temperature with stirring within about 5 minutes into 131 g. of chlorosulphonic acid methyl ester. The solution is slowly and carefully heated to 50° C. when the reaction proceeds exothermically. Heat supply is stopped and stirring continued. The internal temperature thereby rises slowly. At 60° C., after about 10 minutes, the mixture is briefly cooled and the temperature is allowed to rise slowly to 70° C. It is again cooled. By alternatively stirring at room temperature and while cooling with water the reaction is first kept at 70° C. for a short time, and then at approximately 80° C. When the exothermic reaction is completed (at 50 to 80° C., about 45 minutes are required), heating is slowly and carefully continued to 80–85° C. Evolution of hydrogen chloride then sets in and the mixture boils. If the reaction becomes too violent, the mixture is briefly cooled with water. The temperature is then raised to 110° C. and kept at 110 to 115° C. for 2 hours. 15 minutes before ending the heating, ethyl acetate is distilled off. 25 cc. of water are then added dropwise at 110° C. with good stirring. A further 250 cc. of hot water are then added more rapidly. The solution is light-coloured, may be diluted with water in any proportion and is stable to boiling. If necessary, the solution is neutralised with a sodium hydroxide or an ammonium hydroxide solution.

(b) A mixture of 312 g. of styrene and 60 cc. of glacial acetic acid is slowly run at room temperature and with good stirring within less than 8 minutes into 131 g. of chlorosulphonic acid methyl ester. It is then slowly heated to 55° C., the bath removed, and the temperature rises to 70° C. within about 20–25° C. due to a slowly starting exothermic reaction. The mixture is cooled to 65° C. and the temperature kept between 65 to 75° C. by alternatively stirring while cooling briefly with water and at room temperature. The exothermic reaction is terminated at about 80° C. At 85° C., splitting off of hydrogen chloride and gentle boiling of the mixture takes place. The temperature is slowly further raised to 110–115° C. and maintained for 3 hours. 25 cc. of water are added dropwise at 110° C., then more rapidly a further 600 cc. of hot water are added, always at an elevated temperature near the boiling point of the solution in order to allow the ethyl acetate to escape with the steam.

A little viscous, pale brown solution is thus obtained which is miscible with water in any proportion and stable to boiling. By evaporation in a vacuum the condensation product is liberated from the ethyl acetate and residual glacial acetic acid, and brought into the solid form by drying up at room temperature. Upon the addition of 140 g. of sodium chloride at 90° C., the product can also be salted out and brought into the solid form by pressing out while hot.

In analogous manner 416 g. (4 mols) of styrene and 60 cc. of glacial acetic acid are reacted with 131 g. (1 mol) of chlorosulphonic acid methyl ester. The exothermic reaction starts at 60° C. This product also is soluble in water in any proportion.

I claim:
1. A process for producing a condensation product comprising contacting a member selected from the class consisting of styrene and α-methyl styrene monomers at a temperature not exceeding about 115° C. with a member selected from the class consisting of chlorosulfonic acid methylester and chlorosulfonic acid ethylester at a ratio not exceeding about 1 mol of the ester per mol of the said monomers, and thereafter boiling at a temperature not exceeding about 115° C.

2. A process of claim 1 in which the reaction mixture is boiled at a temperature range of about 100° C.–115° C. after substantially completing the initial exothermic reaction.

3. A process of claim 1 wherein the ratio of styrene monomer to the ester reactant is about 1–5:1.

4. A process for the production of condensation products which comprises contacting a member of the group consisting of styrene and α-methyl styrene with a member of the group consisting of chlorosulfonic acid methyl ester and chlorosulfonic acid ethyl ester and heating the reaction mixture after completion of the exothermic reaction to temperatures of at least 100° C.

5. A process for the production of water-soluble condensation products which comprises contacting a member of the group consisting of styrene and α-methyl styrene with a member selected from the group consisting of chlorosulfonic acid methyl ester and chlorosulfonic acid ethyl ester in the molecular ratio of 1:1 to 5:1, and hydrolysing the resulting ester groups in the reaction products.

6. A process for the production of water-soluble condensation products which comprises contacting a member selected from the group consisting of styrene and α-methyl styrene with a member selected from the group consisting of chlorosulfonic acid methyl ester and chlorosulfonic acid ethyl ester in the molecular ratio of 1:1 to 5:1, and heating the reaction mixture after completion of the exothermic reaction in the presence of glacial acetic acid.

References Cited by the Examiner

UNITED STATES PATENTS

| 2,478,390 | 8/1949 | Hanford et al. | 260—459 |
| 2,533,210 | 12/1950 | Baer | 260—505 |
| 2,657,228 | 10/1953 | Hausermann et al. | 260—505 |

OTHER REFERENCES

Belov et al., Chem. Abst., vol. 35 (1941), column 2879.
—— Ibid., vol. 36 (1942), column 446.

JOSEPH L. SCHOFER, *Primary Examiner.*

CHARLES B. PARKER, WILLIAM H. SHORT,
*Examiners.*